United States Patent
Timms et al.

(10) Patent No.: US 6,643,704 B1
(45) Date of Patent: Nov. 4, 2003

(54) DATA NETWORK LOAD MANAGEMENT

(75) Inventors: Allan R. Timms, Peacehaven (GB); David A. Eves, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/532,821

(22) Filed: Mar. 21, 2000

(30) Foreign Application Priority Data

Mar. 23, 1999 (GB) ............................................. 9906628

(51) Int. Cl.[7] ............................................. G06F 15/173
(52) U.S. Cl. ........................ 709/239; 709/242; 709/243
(58) Field of Search ............................... 709/200, 231, 709/238, 239, 235, 219, 224, 226, 242, 243; 717/170

(56) References Cited

U.S. PATENT DOCUMENTS 5,983,005 A * 11/1999 Monteiro et al. ............ 709/231
6,101,328 A * 8/2000 Bakshi et al. ................ 717/170
6,108,703 A * 8/2000 Leighton et al. ............ 709/226
6,185,598 B1 * 2/2001 Farber et al. ................ 709/200

FOREIGN PATENT DOCUMENTS

| EP | 0697613 A2 | 2/1996 | ........... G02B/27/01 |
| EP | 0712065 A2 | 5/1996 | ............. G06F/3/00 |
| EP | 0732660 A1 | 9/1996 | ........... G06F/17/30 |

* cited by examiner

Primary Examiner—Le Hien Luu
(74) Attorney, Agent, or Firm—Daniel J. Piotrowski

(57) ABSTRACT

In a network communications system, a user device (70) includes a communications subsystem operable to establish communications with selected servers (72, 74, 90, 92) of the system. Also included are domain master stations (82, 84) connected to monitor communications traffic loading at each of a respective group of servers. In order to avoid traffic overcrowding at individual servers, a redirector station (78) is provided coupled with the domain master stations and accessible by the user device (70). The redirector station is arranged to select an optimum server (74) to handle communications of a user device on the basis of both the physical location of that server relative to the user device and its current communications traffic loading and, having made its selection, it instructs the user device to re-establish network communications via the selected server.

8 Claims, 3 Drawing Sheets

DATA NETWORK LOAD MANAGEMENT

TECHNICAL FIELD

The present invention relates to user access systems and service provider host systems for data and service networks, particularly but not exclusively for use with the Internet/World Wide Web, and to means for managing communications of a user.

BACKGROUND OF THE INVENTION

Recent years have seen a rapid increase in the amount of data available to a user via data network coupling to remote server, with cheap browser packages for home personal computer (PC) users and dedicated (and cheaper than PC) access mechanisms such as WebTV greatly increasing the number of people on-line. A number of examples of network access and server systems, whether for the Internet or on a smaller local area network (LAN), are described in the introduction to EP-A-0 732 660 (Kambayashi et al/Toshiba) which relates to a mechanism for providing a degree of personalisation in service provision.

In the system described, a number of client systems (for example home users) are enabled to access, via network, data stored by a server. Each of these users is registered with the server having provided to it certain personal details such as an e-mail address and/or telephone number and optionally a photograph. In operation, when a user is accessing a particular store or field of data held by the server, the server provides to the user a list of those other users concurrently accessing the data, perhaps providing an on-screen display of the photographs of those registered users.

As the number of devices having means to access servers, applications, other users and so forth using networks such as the Internet continues to grow, as well as the number of assets and service provider types, the greater the communications traffic loading becomes on individual servers, with users whose access systems are registered with such congested servers suffering from correspondingly poor performance.

It is therefore an object of the present invention to provide a means whereby networked communications systems can reduce loading on individual servers without adversely affecting the performance of those devices set up to establish communications via such servers.

SUMMARY OF THE INVENTION

In accordance with a first aspect of the present invention there is provided a network communications system comprising a plurality of devices interconnected for the exchange of data, the system including:
- a user device including a communications subsystem operable to establish communications with selected other devices of the system;
- a plurality of servers;
- at least one domain master station, the or each such station being connected to monitor communications traffic loading at each of a respective group of said servers;
- a redirector station coupled with said at least one domain master station and accessible by said user device, said redirector station being arranged to select an optimum server to handle communications of a user device on the basis of both the physical location relative to the user device and current communications traffic loading, and to instruct said user device to re-establish network communications via said selected server. In one embodiment, the or each redirector station may determine current communications traffic loading for a server through measurement of delays in communications therewith. Alternatively, or in addition, the or each redirector station may determine, at least partially, current communications traffic loading for a server from CPU and/or memory loading data supplied on request by the server.

Through monitoring by the redirector station for non-responsive servers (as will be described hereinafter), the user access becomes independent of nonfunctioning servers as well as generally being improved in performance through avoiding servers which are congested with traffic. The system suitably comprises a plurality of user devices and domain master stations, with each user device being registered as a client with at least two domain masters, and each such domain master including storage means maintaining a database of registered user device identification data. Since each user device could, in theory, access any server, the need to synchronise user data across all servers would be prohibitive: to avoid this, the user data is suitably just held by one (or preferably at least two) domain masters from where it is accessible by all servers within that domain.

With user data stored at two or more domain masters, each domain master database entry suitably includes identification of the at least one other domain master with which the user device is registered, with the domain masters being configured to transmit received changes to the identification data of a registered device to the or each other such domain master and to update the database on receipt of such changes. In this way, the contents of the users record (as held in two or more domain masters) are synchronised.

The system may feature a plurality of redirector stations, with the or each user device holding means for accessing at least two of said stations. In such an arrangement, the or each user device may hold said means for accessing in the form of network addresses for a first, preferred, redirector station and one or more further, back-up, redirector stations, with the or each back-up redirector station being accessed by a user device only in the event of failure to access the preferred redirector station.

Each server suitably includes a cache memory into which user device information (where provided) is loaded from the domain master for the group including that server on accessing of that server by the registered user. With such an arrangement, each server is preferably configured, on failing to access a domain master station holding identification data for a connected user device, to determine the previous server to which the said user device was connected and request the user identification data from the cache memory in that server.

Further features and advantages of the present invention will become apparent from reading of the following description of preferred embodiments of the present invention, given by way of example only and with reference to the accompanying drawings in which:

DESCRIPTION OF THE PREFERRED EMBODIMENTS

In the following examples, the present invention embodied in an Internet/World Wide Web communication system will be described. The skilled reader will recognise however that the invention is not so limited and the techniques described hereinafter may equally well be applied to smaller scale systems such as a local-area network (LAN) system.

Figure 1:
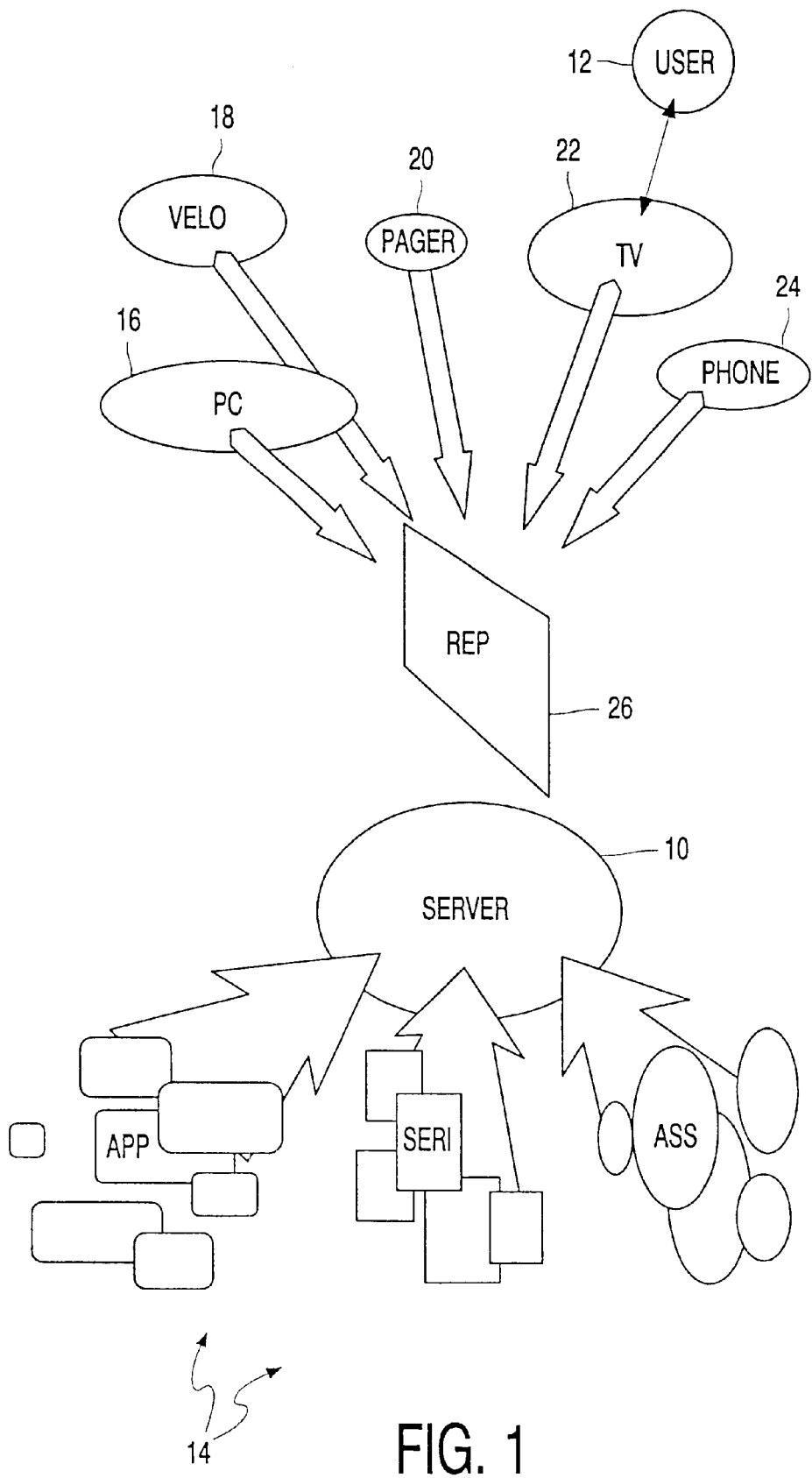
FIG. 1 is a general schematic diagram of user devices enabled to access a plurality of remote services and applications via a server.
Figure 2:
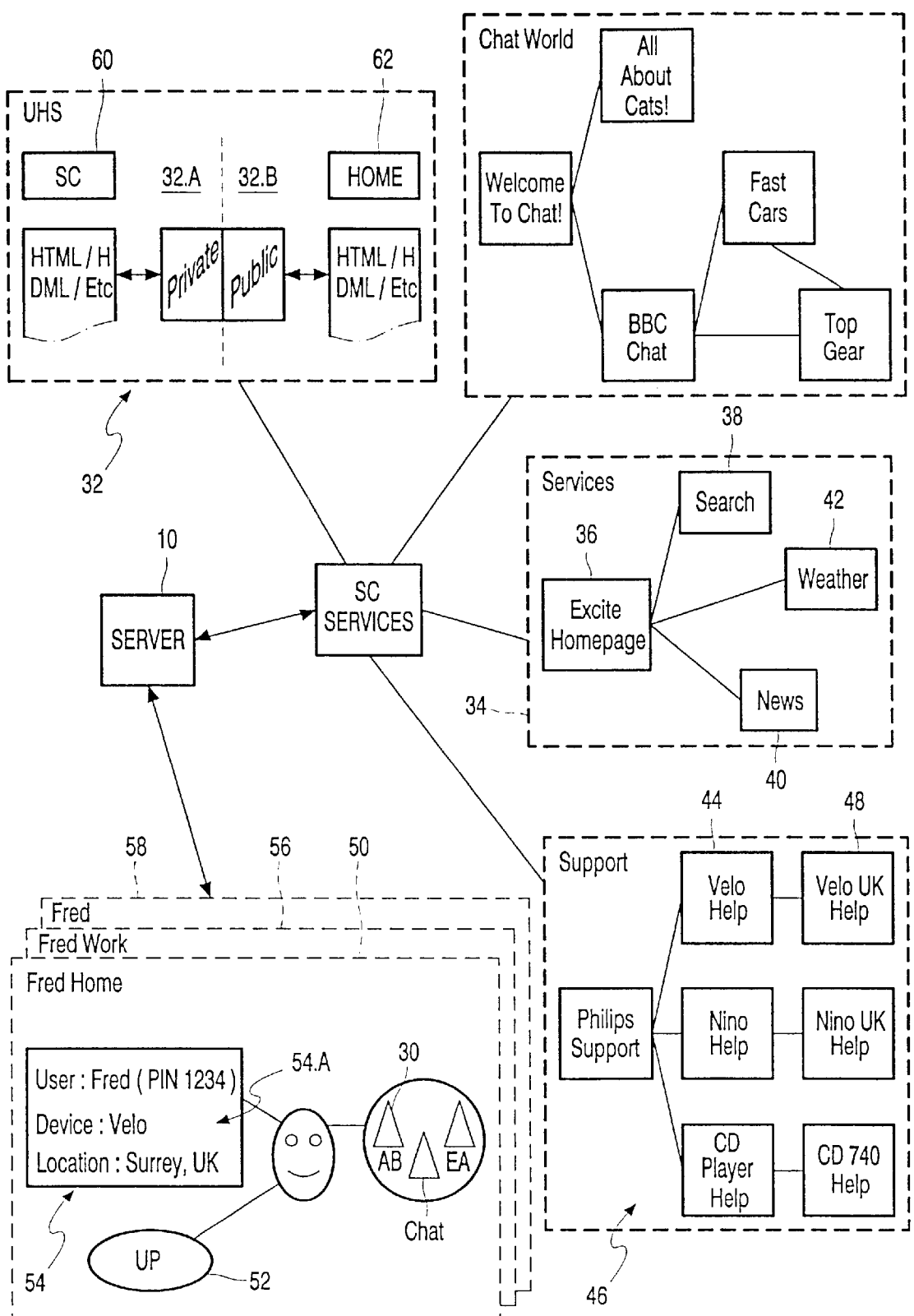
FIG. 2 is a further schematic diagram showing in greater detail aspects of data arrangement in the server of FIG. 1.

Beginning with FIG. 1, in the generalised system shown, a server 10 acts as arbiter between one or more users 12 and content from a variety of sources, indicated generally at 14. As shown, the user access may be by means of any one of a number of devices (clients) in his/her possession, such as a personal computer (PC) 16, electronic personal organiser (VELO) 18, pager 20, television 22 (the selected means in the illustrated example), or telephone 24. To handle, for the user, the large number of potential interface arrangements between types of user access device and accessed applications APP, assets ASS or services SERI, the server 10 stores a representation REP (shown generally at 26) of both the user and the clients that they use, with services being made available and the content that they use arranged for optimum suitability to the users preferences (as stored by the server) and different client capabilities. This information is structured in the server 10 through a combination of user-traversable "Rooms" providing a context for the users virtual presence and "Objects" specifying content. An example of such an information structure will now be briefly described with reference to FIG. 2: a more detailed description of the techniques for arrangement according to user preference is provided in our International Patent Application PCT/EP99/04774 entitled "Data Network Interfacing".

Objects are the simplest of the data types. They are a general container for a variety of elements of the simplified connection environment provided. Initially they are used to represent applications, services, and content that are available either to a user and contained within a user structure, or available to any user within a room. An example of the first would be an address book application AB (as at 30) that the user would have chosen to use. This would always be available to the user whatever room they were in, but not generally available to other users. Objects within a room may be considered as having similarities to a shared white board within a video conferencing room or a bulletin board, with the users in that room all having that application made available to them. Rooms may be understood as a metaphor for operational context which a user or object can be in, and may vary from a single bit data storage location to a fully rendered graphic representation of a three-dimensional virtual landscape navigable by the user. For example, each user may be assigned their own home room UHS 32. This represents both a personal and private space that they have some control over and a point of contact for them with the system and to them by applications and other users within the system. Services and applications will also be represented on the server by rooms. Each service 34 or application will generally be made up of a number of rooms 36, 38, 40, 42 in a hierarchical structure, though simpler applications may have only a single associated space. Association between content and/or services can be made through linking the rooms. Certain services will be able to use the room structure to provide additional support, for example for multi-user online chat or a shared white board.

Rooms can contain users and/or objects. So, for example, the personal organiser (Velo) help room 44 which is liable to be a HTML page when viewed on the screen of a personal organiser could have a number of users within it at any time. One of these "users" might be the system presence of a service representative who can then use a chat object (which represents a simple application) contained within that room to answer user queries.

Users considered within the system are a virtual embodiment 50 of the real user of the system, containing information on applications to use, personal preferences UP 52, and information 54 identifying themselves, their location and the client or user device they are using to access the system. A real user may have a number of alter egos 50, 56, 58, represented by different users on the system, for example to differentiate between home and work life. While these will be separate users (insofar as the system is concerned), the relationship between them is also embodied so that common information can be shared.

When a user is activated, its stored information 54 will contain a tag 54A representing the type of client device being used to access the system. If the real user is simultaneously on line via a number of client devices, they will actually appear as a number of distinct users in the system. Depending on functionality and user choice, these multiple identities might be permitted to roam independently or to be linked together so that actions on one device are immediately reflected on to the others.

For new users, a simplified connection (SC) procedure is suitably followed: a user, buying a device which has the SC capability enabled via a single button, does not need to be provided with items such as service provider home page address and registration protocols: instead, the user establishes any necessary physical connections and presses the button. A small software application on the device is run establishing an Internet link to the particular server 10 and bringing up a basic login screen requesting the users name and personal identification number (PIN). Because the user does not know what his PIN should be, he indicates this (and the fact that he is a new user) through a separate "initialise" button on the login screen or client controls and the server enters a registration procedure.

The input screen changes to allow the user to input his name, location, preferred language, etc. This information is sent to the server which checks the details against its existing database and responds by generating a unique PIN. This number is stored directly in a reserved location in the memory of the client device and is offered to the user—to be remembered for secure transactions and future purchases.

The server now downloads and offers a set of configuration options, and a choice of basic applications and services, for example an address book application, a chat tool and a share price monitor. Once selected, the necessary software changes, upgrades, and settings are downloaded and installed. In addition, factory defined applications and tools will also be installed. This should be the last time at the user needs to go through such a detailed set up process with any similarly configured Internet connected product. The selected applications are made available from the users simplified connection menu and, where the client operating system supports the feature, from short cut icons installed on their desktop.

If at any point the user wishes to access restricted information or make a secure transaction, he will need to enter his PIN. An option for this is made available at all times: once done, the user has total freedom to interact with all SC services requiring some degree of security clearance without having to repeatedly enter the code, and preferably without having to enter different codes for each application or service accessed via the server.

When the user next purchases a product having the SC feature, the procedure is suitably again initiated as a one-button-press operation. On pressing the button, the user is presented with the login screen with which he is familiar from the previous product. He now types in his name and PIN and the server goes into action, setting the system up in his favoured language, with the clock set to the standard correct time zone for that user and presenting details from a favoured application, such as offering a simple share price display.

Figure 3:
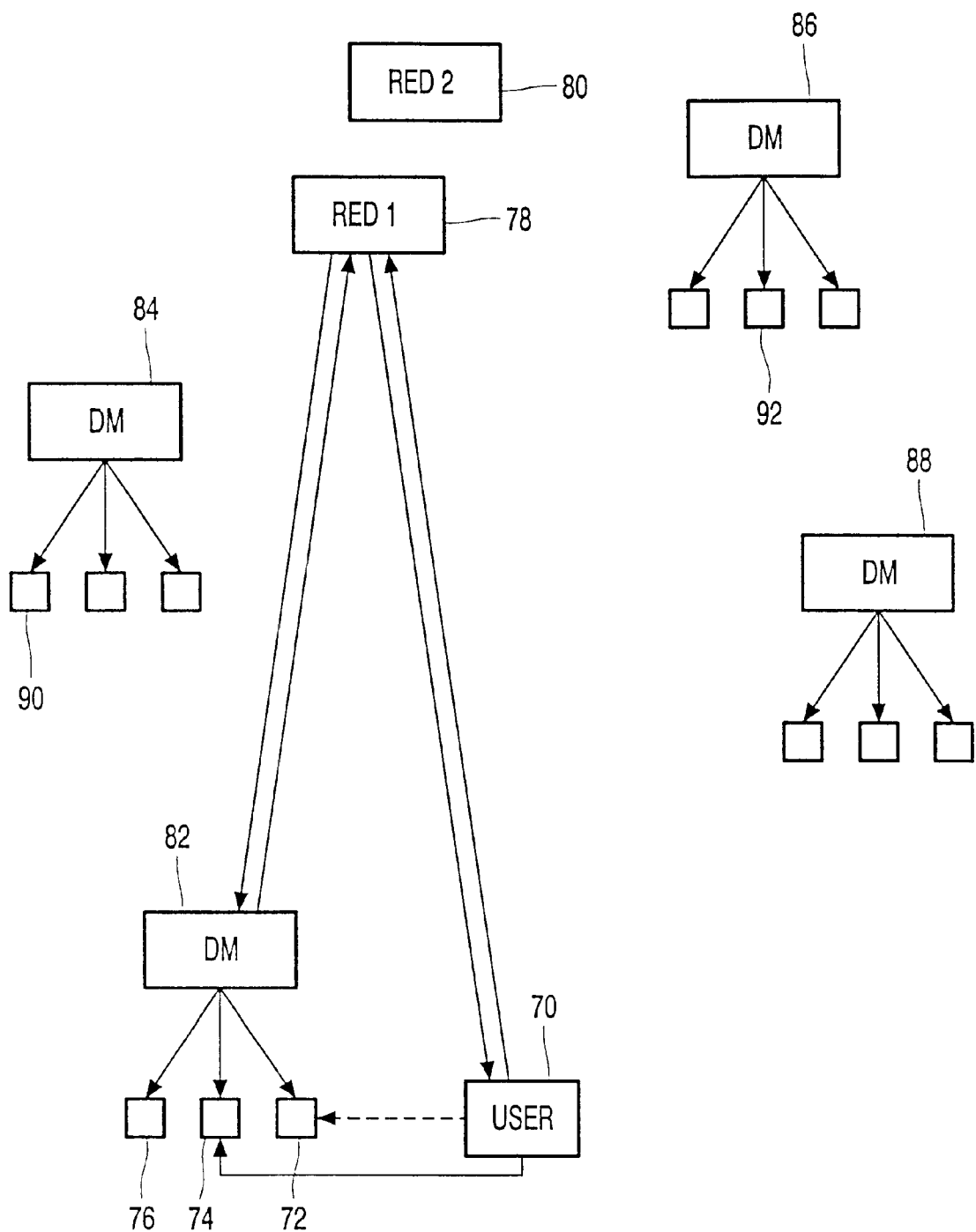
FIG. 3 illustrates an arrangement of server domain masters and connection redirectors for enhanced efficiency in the users connection.

For obtaining a server connection, and more particularly to avoid overloading of servers, the procedure will now be described with reference to FIG. 3. Each client or user device 70 will need to make a connection to a server 72, 74 or 76, and to maximise the bandwidth a client receives, this should in general be the closest server 72 to the client. Each client 70 is provided with a list of contact locations within the network, which locations feature specially configured servers arranged to act as redirectors 78, 80, which tell the client which server 72, 74, 76 they should contact for general operation. Although the list entries could be in the form of static information provider addresses within the network, it is preferred to hold them in the form of symbolic names (e.g. redirector1.philips.com, redirector2.philips.com) linked to a rewritable store holding respective network addresses for each symbolic name. In this way, the list may be updated by all redirectors upon client contact allowing for the addition of extra addresses and the alteration or re-ordering of others.

In order to select the most appropriate server, each client 70 knows its geographical location: this may be requested as a user input parameter or may be determined by partially or wholly automated means such as an internal GPS detector. The redirector server 78 it contacts can measure very accurately the connection lag, through timing the delay in reply to a request message: on the basis of the combination of lag and user location, the redirector server can redirect the client to the most appropriate server 74 if it determines that the lower traffic loading at this other server will more than compensate for the greater distance between client and server. The load measurement may be a two-stage process, since the CPU/memory load affects performance, as does loading of the network to the server suitably consisting of sending an enquiry message to the device requesting data on its current memory loading and processor capabilities, and then timing how long it takes for the reply to come back.

This provision of redirector servers thereby enables load balancing across equivalent servers. For example, if a user connects from "Location A, United Kingdom", where a server 72 is also based, the users client 70 contacts its primary redirector 78, telling it this location information. The redirector 78 holds specification data on UK servers 72, 74, 76, and also has live data on the current operational load of each machine obtained through interrogation of a domain master station 82 in contact with the servers in the UK Domain. The redirector 78 then sends back to the user the address of a functioning server, having taken appropriate steps for load balancing, i.e. it may send back the address for a server 74 at Location B rather than Location A, because the server at B currently has fewer connected users. This assignment of servers by the redirector makes the client 70 independent of non-functioning servers, and also tries to ensure that each client gets maximum performance for every session, no matter where they are.

Non-functioning servers are detected through the failure to respond to an enquiry as to CPU loading from the above-mentioned load measurement process. Upon expiration of a selected timeout period, that server would be marked as being non-responding. Periodic rechecking of these non-responding servers will ensure that intermittent failures or reboots are spotted and a server is not marked as non-functioning for much longer than is actually the case.

With regard to the server organisation, in theory, since each client 70 can always connect to any server, all servers 76, 90, 92 must potentially know all details for all users. However, in practice, this is not possible, since the synchronisation traffic would be enormous. What is needed is a way of communicating changes effectively, and minimising the lag of individual servers. The structure for this activity is also shown in FIG. 3.

In this arrangement, only the Domain Masters 82, 84, 86, 88 (the specialised servers overseeing the operation of a number of "conventional", or domain, servers within a particular area) hold account information for users, and domain servers 72, 74, 76 simply have cached copies of user information. Therefore, if a client 70 always connects to United Kingdom domain server 72, interactive response will be quick since this server will always have the most up-to-date copy of the user information. Any domain server 90, 92 (no matter which domain that they belong to) may request information on the user, and in this instance the information will again be cached. Each client (user) belongs to a minimum of two domains, with an internally held hierarchy in which one is identified as primary and the next secondary, then tertiary and so forth. Both the primary and secondary domains synchronise account information for the user. For example, a UK-based client may have his account information primarily held in a UK Domain Master 82 but synchronised with a French Domain Master 84, selected as the secondary domain. This provides a very robust system.

There are a few possible failure scenarios with such an arrangement, but the general robustness of the arrangement means that only in extremely unlikely scenarios will failures affect what the user sees. Any single server failure, for example, will not affect user service at all. If a single Domain Master 82 fails, the users can connect to their usual domain server 72, but it will update the secondary synchronised Domain Master 84, instead of just its primary. This will mean that the user sees no disruption at all, and everything will work as normal. Should the users primary and secondary Domain Masters 82, 84 fail at the same time, the redirectors 78, 80 will cause the users client to contact the last used domain server 74, which has the last cached copy of the users information, and since this is up to date, the user would see no difference in service. The relevant Domain Master or Masters would then catch up once they come back on line.

A worst possible case scenario would be the unlikely situation of both Domain Masters 82, 84 being off line, and the last server 74 contacted being simultaneously off line. In this case, the redirector 78 would first search for any cached copy of the user information which, if found (perhaps in 72), would be used although it would be out of date. If the redirector 78 could not find a copy, then the user 70 would be able to use the service, but the settings would not be available until the Domain Masters reappeared. This is the only case where the user would see any operational difference.

Suitably, the system may be given more stability through short lived synchronisation between Domain Masters, in which each user may belong to many Domains, and therefore has up-to-date information on more than two Domain Master machines. For example, if a user (with Domain Masters primary UK 82, secondary France 84), travels to the US, his account information is marked as being in the US Domain, and therefore gets synchronised in a US Domain Master 86. This means that an extra machine must go down before reliance is introduced on copies. In the absence of any contact with the additional (US) Domain Master 86 for a predetermined period, such as 3 weeks or 3 months, the synchronisation may be cancelled and the extra copy of the users details removed to avoid the third Domain Master becoming overburdened with redundant user data. For critical accounts (such as help desks) and other accounts as required, the list can be expanded by permanently adding data to other domains for extra reliability but without the need to travel to, or periodically connect to, another Domain.

From reading the present disclosure, other modifications will be apparent to persons skilled in the art. Such modifications, whilst remaining within the scope of the following claims, may involve other features which are already known in the design, manufacture and use of data transmission and presentation systems, display apparatuses and component parts thereof and which may be used instead of or in addition to features already described herein.

What is claimed is:

1. A network communications system comprising a plurality of devices interconnected for the exchange of data, the system including:

a user device including a communications subsystem operable to establish communications with selected other devices of the system;

a plurality of servers;

at least one domain master station, the station being connected to monitor communications traffic loading at each of a respective group of said servers;

a redirector station coupled with said at least one domain master station and accessible by said user device, said redirector station being arranged to select an optimum server to handle communications of a user device on the basis of both the physical location relative to the user device and current communications traffic loading, and to instruct said user device to re-establish network communications via said selected server; and a plurality of user devices and domain master stations, each user device being registered as a client with at least two domain masters, each such domain master including storage means maintaining a database of registered user device identification data;

wherein each domain master database entry includes identification of the at least one other domain master with which the user device is registered, the domain masters being configured to transmit received changes to the identification data of a registered device to the or each other such domain master and to update the database on receipt of such changes.

2. A network communications system comprising a plurality of devices interconnected for the exchange of data, the system including:

a user device including a communications subsystem operable to establish communications with selected other devices of the system;

a plurality of servers;

at least one domain master station, the station being connected to monitor communications traffic loading at each of a respective group of said servers;

a redirector station coupled with said at least one domain master station and accessible by said user device, said redirector station being arranged to select an optimum server to handle communications of a user device on the basis of both the physical location relative to the user device and current communications traffic loading, and to instruct said user device to re-establish network communications via said selected server;

a plurality of user devices and domain master stations, each user device being registered as a client with at least two domain masters, each such domain master including storage means maintaining a database of registered user device identification data; and a plurality of redirector stations, with the user device holding means for accessing at least two of said redirector stations.

3. A system as claimed in claim 2, wherein the user device holds said means for accessing in the form of network addresses for a first, preferred, redirector station and one or more further, back-up, redirector stations, with the back-up redirector station being accessed by a user device only in the event of failure to access the preferred redirector station.

4. A network communications system comprising a plurality of devices interconnected for the exchange of data, the system including:

a user device including a communications subsystem operable to establish communications with selected other devices of the system;

a plurality of servers;

at least one domain master station, the station being connected to monitor communications traffic loading at each of a respective group of said servers;

a redirector station coupled with said at least one domain master station and accessible by said user device, said redirector station being arranged to select an optimum server to handle communications of a user device on the basis of both the physical location relative to the user device and current communications traffic loading, and to instruct said user device to re-establish network communications via said selected server; and a plurality of user devices and domain master stations, each user device being registered as a client with at least two domain masters, each such domain master including storage means maintaining a database of registered user device identification data;

wherein said sever includes a cache memory into which user device information is loaded from the domain master for the group including said server on accessing of said server by the registered user.

5. A system as claimed in claim 4, wherein each server is configured, on failing to access a domain master station holding identification data for a connected user device, to determine the previous server to which the said user device was connected and request the user identification data from the cache memory in that server.

6. A network communications system comprising a plurality of devices interconnected for the exchange of data, the system including:

a user device including a communications subsystem operable to establish communications with selected other devices of the system;

a plurality of servers;

at least one domain master station, the station being connected to monitor communications traffic loading at each of a respective group of said servers;

a redirector station coupled with said at least one domain master station and accessible by said user device, said redirector station being arranged to select an optimum server to handle communications of a user device on the basis of both the physical location relative to the user device and current communications traffic loading, and to instruct said user device to re-establish network communications via said selected server; and wherein the redirector station determines, at least partially, current communications traffic loading for said server through measurement of delays in communications therewith.

7. A system as claimed in claim 6, wherein the redirector station determines, at least partially, current communications traffic loading for said server from CPU loading data supplied on request by said server.

8. A system as claimed in claim 6, wherein the redirector station determines, at least partially, current communications traffic loading for said server from memory loading data supplied on request by said server.

* * * * *